(12) United States Patent
Chung

(10) Patent No.: US 11,867,346 B2
(45) Date of Patent: Jan. 9, 2024

(54) MOUNTING DEVICE FOR MOUNTING ELECTRONIC PRODUCT ON SUPPORTING RACK

(71) Applicant: Nanning FuLian FuGui Precision Industrial Co., Ltd., Nanning (CN)

(72) Inventor: Wen-Han Chung, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 191 days.

(21) Appl. No.: 17/679,615

(22) Filed: Feb. 24, 2022

(65) Prior Publication Data
US 2023/0265962 A1 Aug. 24, 2023

(51) Int. Cl.
 F16M 11/04 (2006.01)
(52) U.S. Cl.
 CPC .................. F16M 11/041 (2013.01)
(58) Field of Classification Search
 CPC ... A47B 96/067; A47F 5/0838; F16M 11/041; H05K 5/0221; H05K 7/14; H05K 7/1488; H05K 7/1489; H05K 7/183
 See application file for complete search history.

(56) References Cited

U.S. PATENT DOCUMENTS

| | | | | |
|---|---|---|---|---|
| 5,332,108 A * | 7/1994 | Blass | ..................... | A47F 5/0846 211/90.02 |
| 6,739,682 B2 * | 5/2004 | Shih | ..................... | H05K 7/1421 312/334.4 |
| 7,595,985 B2 * | 9/2009 | Adducci | ................ | H04Q 1/066 165/122 |
| 7,975,860 B2 * | 7/2011 | Dittus | .................. | H05K 7/1489 211/207 |
| 8,235,341 B2 | 8/2012 | Taylor | | |
| 8,749,993 B2 * | 6/2014 | Hoshino | ............ | H05K 7/20727 361/679.01 |
| 8,870,311 B2 * | 10/2014 | Chang | .................... | H05K 7/183 312/334.4 |
| 9,711,952 B2 * | 7/2017 | Lütze | ..................... | H02B 1/011 |
| 9,848,703 B2 * | 12/2017 | Chen | .................... | H05K 7/1489 |
| 9,913,396 B2 * | 3/2018 | Chen | .................... | H05K 7/1489 |
| 10,225,946 B2 * | 3/2019 | Yu | ......................... | A47B 88/493 |
| 10,376,055 B2 * | 8/2019 | Chen | ..................... | H05K 7/183 |

(Continued)

FOREIGN PATENT DOCUMENTS

| | | |
|---|---|---|
| CN | 103813676 A | 5/2014 |
| TW | 200822844 A | 5/2008 |
| TW | M361205 U1 | 7/2009 |

*Primary Examiner* — Patrick D Hawn
(74) *Attorney, Agent, or Firm* — ScienBiziP, P.C.

(57) ABSTRACT

A device for the rapid and convenient mounting of an electronic product on a supporting rack includes a holding rack, an engaging element, and a lock mechanism. A holding plate of the holding rack engages a first edge of the supporting rack, and holds the electronic product. An extension plate with first position and second position holes is connected to the holding plate, and the engaging element can pivot on the holding plate. The lock mechanism disposed on the engaging element can be selectively inserted into the first position hole and the second position hole. When the electronic product is mounted on the supporting rack, the lock mechanism is inserted into the first position hole, the holding plate is engaged with the first edge, and the engaging element is engaged to a second edge of the supporting rack.

10 Claims, 4 Drawing Sheets

(56) References Cited

U.S. PATENT DOCUMENTS

| | | | |
|---|---|---|---|
| 10,602,637 B2* | 3/2020 | Chen | A47B 88/483 |
| 11,647,604 B1* | 5/2023 | Lin | H05K 7/183 |
| | | | 211/26 |
| 11,765,845 B2* | 9/2023 | Lin | H05K 5/0221 |
| | | | 312/334.4 |
| 2004/0104184 A1* | 6/2004 | Hartman | G06F 1/183 |
| | | | 211/192 |
| 2004/0120106 A1* | 6/2004 | Searby | G06F 1/181 |
| | | | 361/679.58 |
| 2008/0304903 A1* | 12/2008 | Huang | H05K 7/1489 |
| | | | 211/208 |
| 2010/0243586 A1* | 9/2010 | Henderson | H05K 7/1489 |
| | | | 248/220.21 |
| 2011/0180316 A1* | 7/2011 | Nakayama | H05K 7/1421 |
| | | | 312/223.1 |
| 2013/0112638 A1* | 5/2013 | Dittus | H05K 7/183 |
| | | | 211/123 |
| 2017/0013732 A1* | 1/2017 | Kipfer | E05B 47/0001 |
| 2021/0211791 A1* | 7/2021 | Fredriksson | A47B 95/008 |

* cited by examiner

MOUNTING DEVICE FOR MOUNTING ELECTRONIC PRODUCT ON SUPPORTING RACK

FIELD

The subject matter herein generally relates to mounting devices for electronic products.

BACKGROUND

Wireless access points and wireless routers are widely installed in indoor environments. In order to facilitate user installation, many such wireless communication devices are designed to be installed in indoor environment by a mounting device.

However, the installation process of such wireless communication devices may be complicated, and difficult for users to install. Therefore, a more user-friendly mounting device is needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
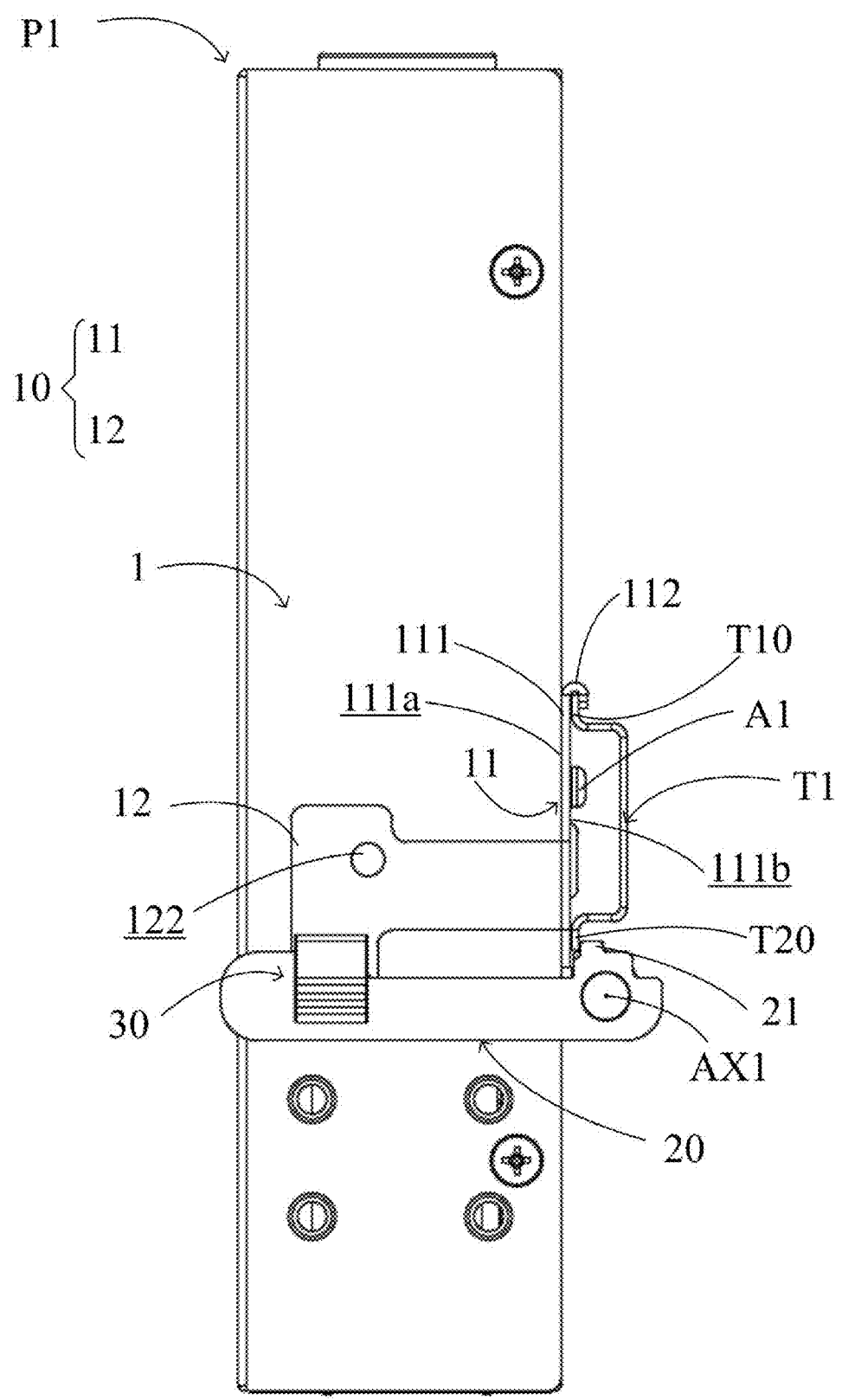
FIG. 1 is a side view of a mounting device in an embodiment according to the present disclosure, wherein an electronic product is mounted on the mounting device, and the mounting device is mounted on a supporting rack.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The mounting device of the present disclosure allows easy installation of an electronic product on a supporting rack, and removal of the electronic product from the supporting rack, so as to hang the electronic product indoors or outdoors.

Figure 2:
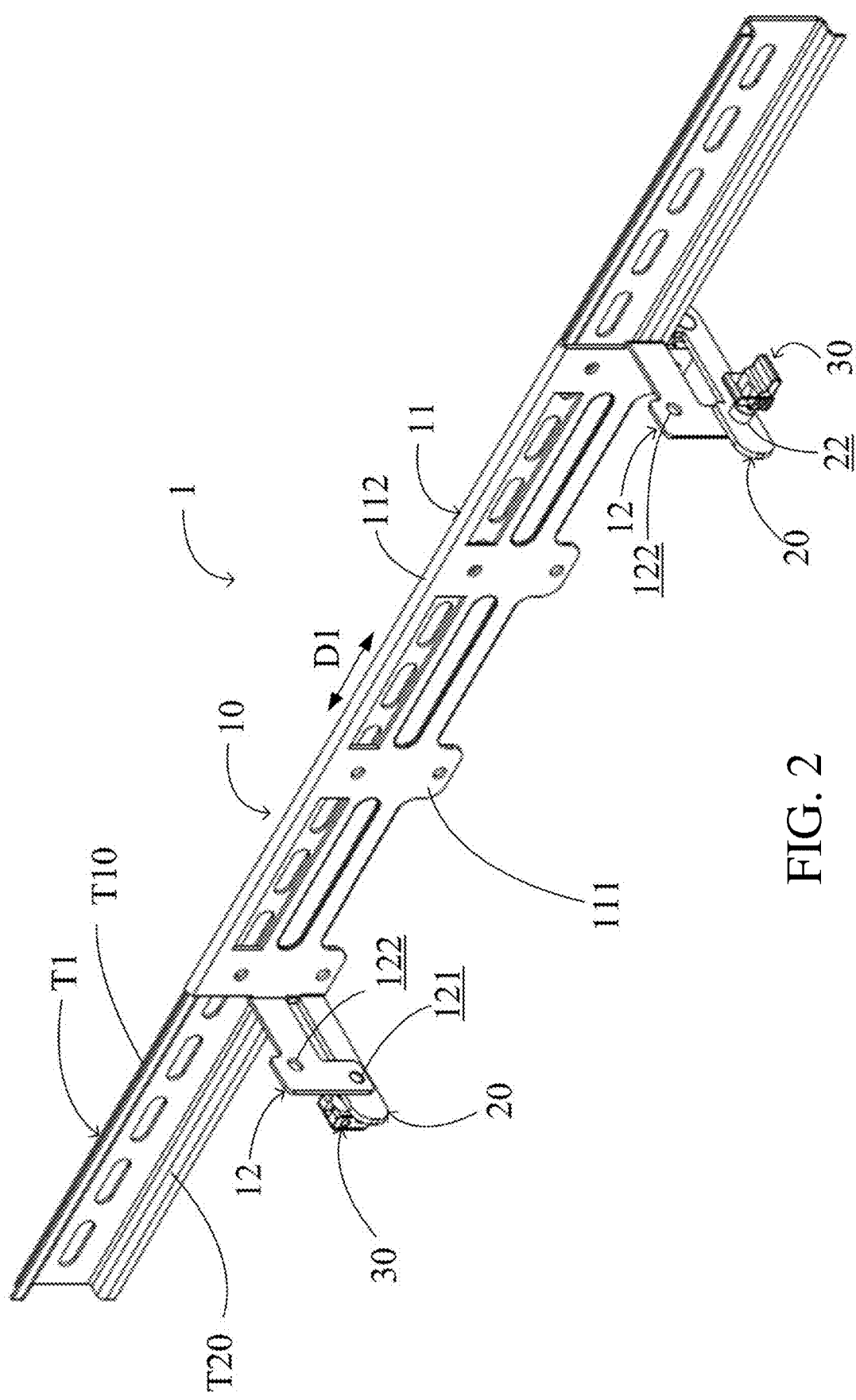
FIG. 2 is a perspective view of the mounting device of FIG. 1, wherein the mounting device is mounted on the supporting rack.
Figure 3:
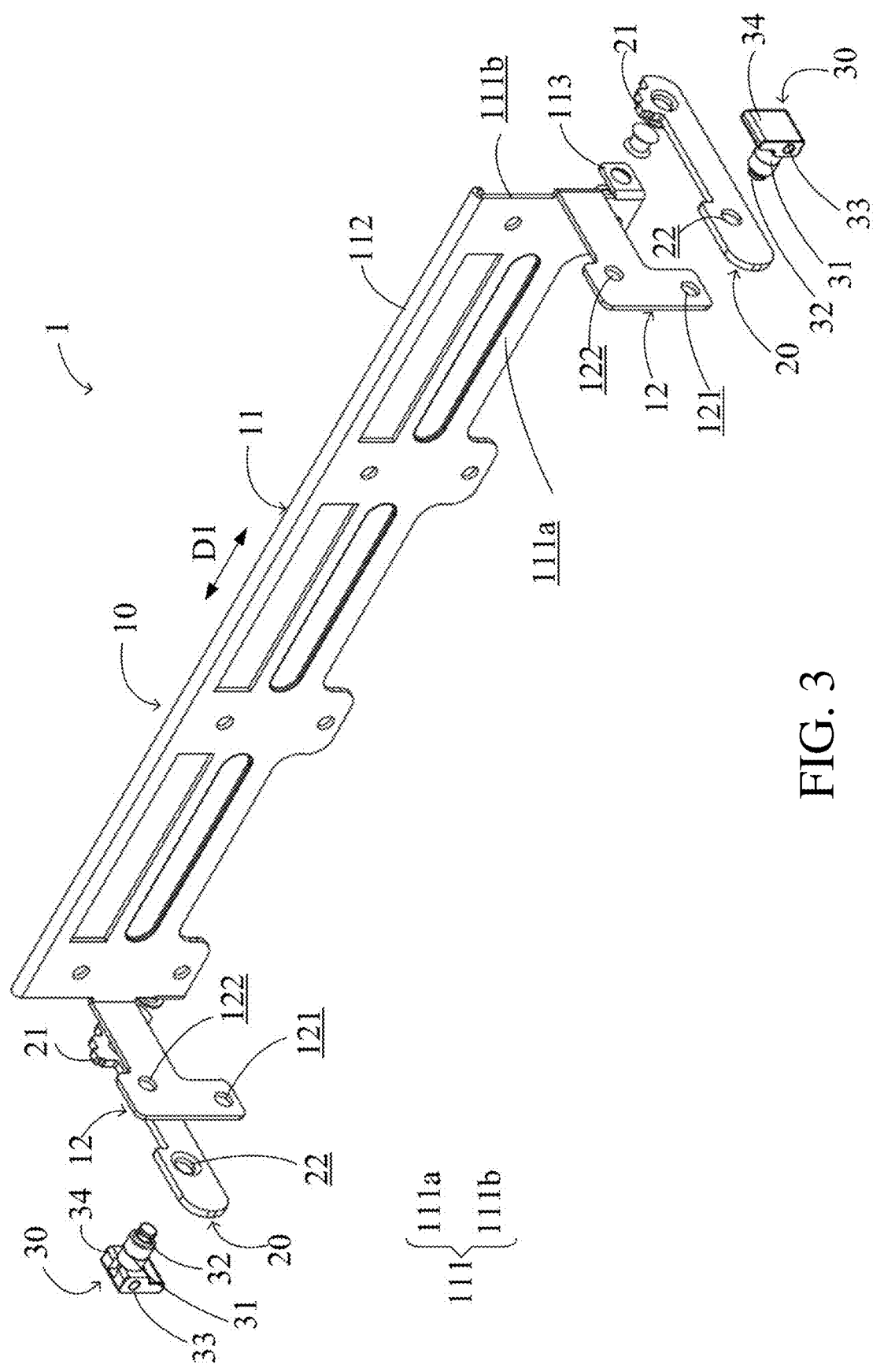
FIG. 3 is an exploded view of the mounting device of FIG. 1.

FIG. 1 is a side view of a mounting device 1 in an embodiment according to the present disclosure. An electronic product P1 is mounted on the mounting device 1, and the mounting device 1 is mounted on a supporting rack T1. FIG. 2 is a perspective view of the mounting device 1 of FIG. 1, wherein the mounting device 1 is mounted on the supporting rack T1. FIG. 3 is an exploded view of the mounting device 1 of FIG. 1. The mounting device 1 is used to mount the electronic product P1 on the supporting rack T1. In this embodiment, the supporting rack can be a DIN rail. The electronic product P1 can be a wireless access point, a wireless router, or a camera, not being limited.

The supporting rack T1 is an elongated structure, and can be made from a metal plate. The supporting rack T1 can be affixed to indoor ceilings, walls, or cabinets. Moreover, the supporting rack T1 can be affixed to outdoor walls, for example. In this embodiment, the supporting rack T1 extends in an extension direction D1. The supporting rack T1 has a first edge T10 and a second edge T20. The first edge T10 is opposite and parallel to the second edge T20. The first edge T10 and the second edge T20 extend in the extension direction D1.

The mounting device 1 includes a holding rack 10, two engaging elements 20, and two lock mechanisms 30. The holding rack 10 includes a holding plate 11 and two extension plates 12. The holding plate 11 is used to engage the first edge T10 of the supporting rack T1, for holding the electronic product P1. In this embodiment, the holding plate 11 includes a body portion 111, a hook portion 112, and two protrusion portions 113. The body portion 111 is an elongated plate extending in the extension direction D1. The body portion 111 has a front surface 111a and a rear surface 111b. The front surface 111a is opposite to the rear surface 111b, and the front surface 111a and the rear surface 111b extend in the extension direction D1. The electronic product P1 can be affixed to the front surface 111a. In this embodiment, the electronic product P1 is fastened to the body portion 111 by fasteners A1. When the electronic product P1 is mounted on the supporting rack T1, the body portion 111 and the supporting rack T1 extend in the same direction.

The hook portion 112 is connected to and protrudes over the rear surface 111b of the body portion 111, and engages the first edge T10 of the supporting rack T1. The hook portion 112 is a curved and elongated structure. The hook portion 112 extends in the extension direction D1. The length of the hook portion 112 in the extension direction D1 is longer than the length of half of the body portion 111 in the extension direction D1. The protrusion portions 113 are connected to and protrude over the rear surface 111b of the body portion 111, and extend perpendicular to the rear surface 111b of the body portion 111. The protrusion portions 113 are connected to the ends of the rear surface 111b.

The extension plates 12 are connected to and protrude over the front surface 111a of the body portion 111, and extend perpendicular to the body portion 111. In other words, one protrusion portion 113 and one extension plate 12 extend on the same plane. Moreover, the extension plates 12 are connected to the ends of the front surface 111a. In this embodiment, the extension plate 12 is or in a T-shape or an L-shape. Moreover, the extension plate 12 has a first position hole 121 and a second position hole 122.

The engaging elements 20 pivot on the protrusion portions 113 of the holding plate 11. The engaging elements 20 extend parallel to the extension plate 12, and are perpendicular to the body portion 111. In this embodiment, each engaging element 20 is rotated about a central axis AX1 relative to the holding plate 11. The central axis AX1 is parallel to the extension direction D1. The distance between the first position hole 121 and the central axis AX1 is equal to the distance between the second position hole 122 and the central axis AX1. In this embodiment, the engaging element 20 is an elongated plate. The engaging element 20 includes a hook 21 and a through hole 22. The hook 21 and the through hole 22 are at the ends of the engaging element 20. The hook 21 engages the second edge T20 of the supporting rack T1.

The lock mechanism 30 is disposed on one engaging element 20, and is inserted into one first position hole 121 or one second position hole 122. When the electronic product P1 is mounted on the supporting rack T1, the lock mechanism 30 passes through the through hole 22. In this embodiment, the lock mechanism 30 includes a base 31, a latch 32, a shaft 33, and a handle 34. The base 31 is a tube affixed to the engaging element 20.

The latch 32 is movably disposed in the base 31, and is inserted into one first position hole 121 or one second position hole 122. When the latch 32 is inserted into the first position hole 121 or the second position hole 122, the latch 32 passes through the through hole 22 of the engaging element 20. In this embodiment, the base 31 and the latch 32 extend perpendicularly to the engaging element 20. The shaft 33 is connected to the latch 32. The handle 34 is rotatably connected to the shaft 33. When the handle 34 is rotated, the latch 32 is moved relative to the base 31 in the extension direction D1.

As shown in FIG. 1 and FIG. 2, when the electronic product P1 is mounted on the supporting rack T1, the lock mechanism 30 is inserted into the first position hole 121 of the extension plate 12, so as to restrict the rotation of the engaging element 20 relative to the holding plate 11. The hook portion 112 of the holding plate 11 is engaged with the first edge T10, and the hook 21 of the engaging element 20 is engaged with the second edge T20 of the supporting rack T1. Thereby, the electronic product P1 can be stably mounted on the supporting rack T1 via the mounting device 1.

Figure 4:
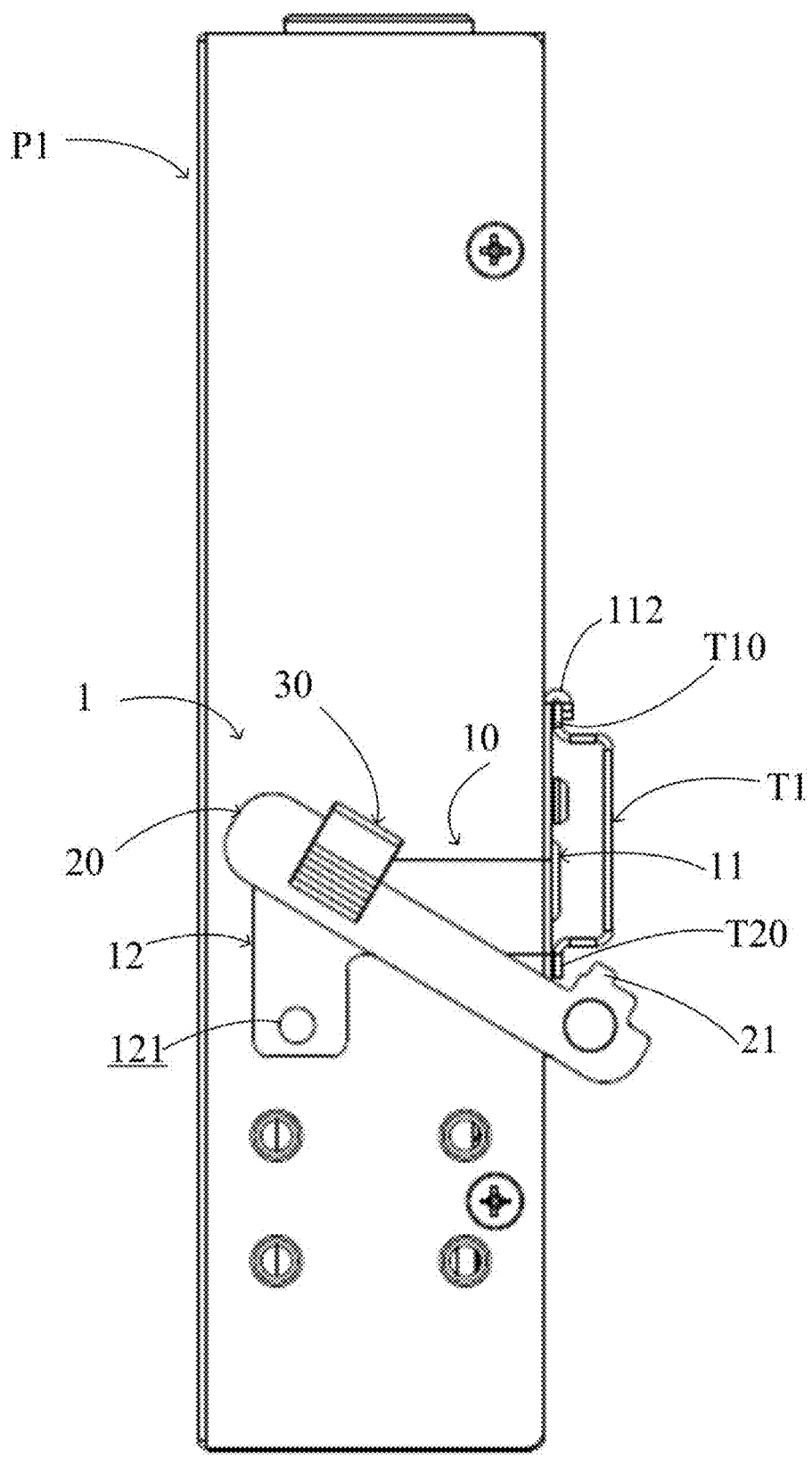
FIG. 4 is a side view of the mounting device of FIG. 1, wherein the mounting device is in a configuration that the electronic product is removable from the supporting rack.

FIG. 4 is a side view of the mounting device 1 of FIG. 1, wherein the mounting device 1 is in a configuration that the electronic product P1 is removable removed from the supporting rack T1. When the electronic product P1 is to be removed from the supporting rack T1, the handle 34 can be operated to separate the latch 32 from the first position hole 121 from the extension plate 12, so as to allow the engaging element 20 to be rotated relative to the holding plate 11. Afterwards, as shown in FIG. 3 and FIG. 4, the handle 34 can be operated to insert the latch 32 into the second position hole 122. At this time, the lock mechanism 30 restricts the rotation of the engaging element 20 relative to the holding plate 11. Moreover, the hook 21 of the engaging element 20 is separated from the second edge T20 of the supporting rack T1. Thereby, the electronic product P1 can be easily removed from the supporting rack T1.

As shown in FIG. 3 and FIG. 4, when the electronic product P1 is to be mounted on the supporting rack T1, the hook portion 112 of the holding plate 11 is engaged with the first edge T10. Moreover, the lock mechanism 30 can be operated to allow the rotation of the engaging element 20 relative to the holding plate 11. Afterwards, as shown in FIG. 1 and FIG. 2, the lock mechanism 30 is operated to insert the latch 32 into the first position hole 121, so as to restrict the rotation of the engaging element 20 relative to the holding plate 11, and to engage the hook 21 of the engaging element 20 with the second edge T20 of the supporting rack T1. Thereby, the electronic product P1 can be easily mounted or remounted on the supporting rack T1 by the mounting device 1.

According to the embodiments of the disclosure, an electronic product can be very easily mounted on and demounted from a supporting rack by the mounting device.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A mounting device configured to mount an electronic product on a supporting rack, the mounting device comprising:
   a holding rack comprising:
      a holding plate configured to engage a first edge of the supporting rack, and configured to hold the electronic product; and
      an extension plate connected to the holding plate, and comprising a first position hole and a second position hole;
   an engaging element pivoted to the holding plate; and
   a lock mechanism disposed on the engaging element, and the locking mechanism being selectively insertable into the first position hole and the second position hole;
   wherein when the electronic product is mounted on the supporting rack, the lock mechanism is inserted into the first position hole, the holding plate is engaged with the first edge, and the engaging element is engaged with a second edge of the supporting rack.

2. The mounting device as claimed in claim 1, wherein the holding plate further comprises:
   a body portion comprising a front surface and a rear surface, wherein the electronic product is configured to affix to the front surface;
   a hook portion connected to the rear surface, and configured to engage the first edge; and
   a protrusion portion connected to the rear surface,
   wherein each of the protrusion portion and the engaging element extends perpendicular to the body portion, and the engaging element is pivoted on the protrusion portion.

3. The mounting device as claimed in claim 2, wherein the extension plate is connected to the front surface, and extends perpendicular to the body portion.

4. The mounting device as claimed in claim 2, wherein the protrusion portion and the extension plate extend in a same plane.

5. The mounting device as claimed in claim 2, wherein the body portion is an elongated plate, wherein when the electronic product is mounted on the supporting rack, the body portion and the supporting rack extend in a same direction.

6. The mounting device as claimed in claim 1, wherein the engaging element is rotated about a central axis relative to the holding plate, and a distance between the first position hole and the central axis is equal to a distance between the second position hole and the central axis.

7. The mounting device as claimed in claim 1, wherein the engaging element comprises a hook and a through hole, the hook is configured to engage the second edge, wherein when the electronic product is mounted on the supporting rack, the lock mechanism extends through the through hole, wherein the engaging element is an elongated plate, the hook and the through hole are respectively at two ends of the engaging element.

8. The mounting device as claimed in claim 1, wherein the lock mechanism comprises:
   a base affixed to the engaging element; and
   a latch movably disposed in the base, and the latching being selectively insertable into the first position hole and the second position hole;
   wherein when the latch is inserted into the first position hole or the second position hole, the latch extends through the engaging element.

9. The mounting device as claimed in claim 8, wherein the lock mechanism further comprises:
   a shaft connected to the latch; and
   a handle rotatably connected to the shaft,
   wherein when the handle is rotated, the latch is moved relatively to the base.

10. The mounting device as claimed in claim 8, wherein each of the base and the latch extends perpendicular to the engaging element, and the base is a tube.

* * * * *